United States Patent
Farley

(10) Patent No.: US 12,522,995 B2
(45) Date of Patent: Jan. 13, 2026

(54) SELF-FILLING EROSION CONTROL APPARATUS

(71) Applicant: Daniel K. Farley, Traverse City, MI (US)

(72) Inventor: Daniel K. Farley, Traverse City, MI (US)

(*) Notice: Subject to any disclaimer, the term of this patent is extended or adjusted under 35 U.S.C. 154(b) by 122 days.

(21) Appl. No.: 18/534,921

(22) Filed: Dec. 11, 2023

(65) Prior Publication Data

US 2024/0110352 A1    Apr. 4, 2024

Related U.S. Application Data

(63) Continuation-in-part of application No. 17/308,752, filed on May 5, 2021, now Pat. No. 11,859,362.

(60) Provisional application No. 63/023,323, filed on May 12, 2020.

(51) Int. Cl.
*E02B 3/12* (2006.01)
*E02B 3/04* (2006.01)

(52) U.S. Cl.
CPC ................................. *E02B 3/127* (2013.01)

(58) Field of Classification Search
CPC . E02B 3/04; E02B 3/127; E02D 17/20; E02D 17/202
See application file for complete search history.

(56) References Cited

U.S. PATENT DOCUMENTS

| | | | | |
|---|---|---|---|---|
| 3,741 | A | * | 9/1844 | Carr .................... A01K 69/06 43/100 |
| 749,722 | A | | 1/1904 | Dalton et al. |
| 3,653,216 | A | | 4/1972 | Stickler, Jr. |
| 3,957,098 | A | | 5/1976 | Hepworth et al. |
| 4,000,619 | A | | 1/1977 | Ziegler |
| 4,420,275 | A | * | 12/1983 | Ruser ................. E02B 17/0021 405/15 |
| 4,657,433 | A | * | 4/1987 | Holmberg ............... E02B 3/04 405/21 |

(Continued)

FOREIGN PATENT DOCUMENTS

| | | | | |
|---|---|---|---|---|
| CN | 104542509 A | * | 4/2015 | ........... A01K 69/08 |
| FR | 2367146 | | 5/1978 | |
| JP | S6124712 A | * | 2/1986 | |

*Primary Examiner* — Amber R Anderson
*Assistant Examiner* — Stacy N Lawson
(74) *Attorney, Agent, or Firm* — McAndrews, Held & Malloy, Ltd.

(57) ABSTRACT

An erosion control apparatus includes a flexible, container and a cord. The container includes a container upper side, a container lower side opposite the container upper side, a container trailing end, a container leading end opposite the container trailing end, and a container mouth toward the container leading end. The container mouth provides an opening to a container interior. The cord is attached between the container mouth and an attachment point toward the container trailing end. The cord draws the container mouth toward the container trailing end due to a length of the cord between the container mouth and the attachment point being shorter than a length of the container between the container mouth and the attachment point. The cord further draws the container mouth toward a closed position as sediment enters the container mouth, fills the container interior, and urges the container leading end away from the attachment point.

18 Claims, 9 Drawing Sheets

Shoreline

(56) References Cited

U.S. PATENT DOCUMENTS

| | | | |
|---|---|---|---|
| 4,690,585 | A | 9/1987 | Holmberg |
| 4,770,561 | A | 9/1988 | Holmberg |
| 5,190,403 | A | 3/1993 | Atkinson |
| 5,354,132 | A | 10/1994 | Young et al. |
| 5,669,732 | A | 9/1997 | Truitt |
| 6,190,088 | B1 | 2/2001 | Van Der Hidde et al. |
| 6,312,192 | B1 | 11/2001 | Dery |
| 6,834,995 | B1 * | 12/2004 | Stevens .............. B65D 88/1668 383/41 |
| 10,287,038 | B2 | 5/2019 | Boutwell |
| 2014/0161371 | A1 | 6/2014 | Moreau et al. |
| 2019/0226193 | A1 * | 7/2019 | Deurloo .................. E03F 5/046 |

\* cited by examiner

SELF-FILLING EROSION CONTROL APPARATUS

RELATED APPLICATIONS

This application is a continuation-in-part of U.S. patent application Ser. No. 17/308,752, filed May 5, 2021, which claims benefit and priority to U.S. Provisional Patent Application No. 63/023,323, filed May 12, 2020, the disclosures of which are hereby incorporated by reference herein in their entirety.

BACKGROUND OF THE INVENTION

The present invention relates to structures that help reduce erosion, and in particular to structures that help reduce erosion along river banks and shorelines caused by environmental forces such as wind and water currents.

A variety of structures have been used along river banks and shorelines in attempts to reduce further erosion of the river banks and shorelines. For example, sandbags have been placed along river banks and/or shorelines with the hopes of preventing or reducing erosion due to environmental forces. While such sandbags may be effective in reducing erosion, filling sandbags and placing them into the water along river banks and shorelines is time-consuming and back-breaking work.

Limitations and disadvantages of conventional and traditional approaches should become apparent to one of skill in the art, through comparison of such systems with aspects of the embodiments set forth in the remainder of the present disclosure.

BRIEF SUMMARY OF THE INVENTION

An erosion control apparatus generally includes a flexible container having a mouth or opening to its interior. The container may be secured to a surface such as the bed or floor of a body of water. The container may be positioned such that environmental forces (e.g. wind or water currents) direct sediment into the interior of the container via its mouth. In some embodiments, the container may include a cord attached to the mouth of the container and configured to close the mouth of the container as the container is filled with sediment. In particular, the cord may include a noose at one end and may be anchored at the opposite end. A loop of the noose may circumscribe the mouth of the container and tighten around the mouth as sediment urges the mouth away from the anchored end of the cord.

Advantages, aspects, novel features, as well as, details of illustrated embodiments will be more fully understood from the following description and figures.

DETAILED DESCRIPTION OF THE INVENTION

Figure 1:
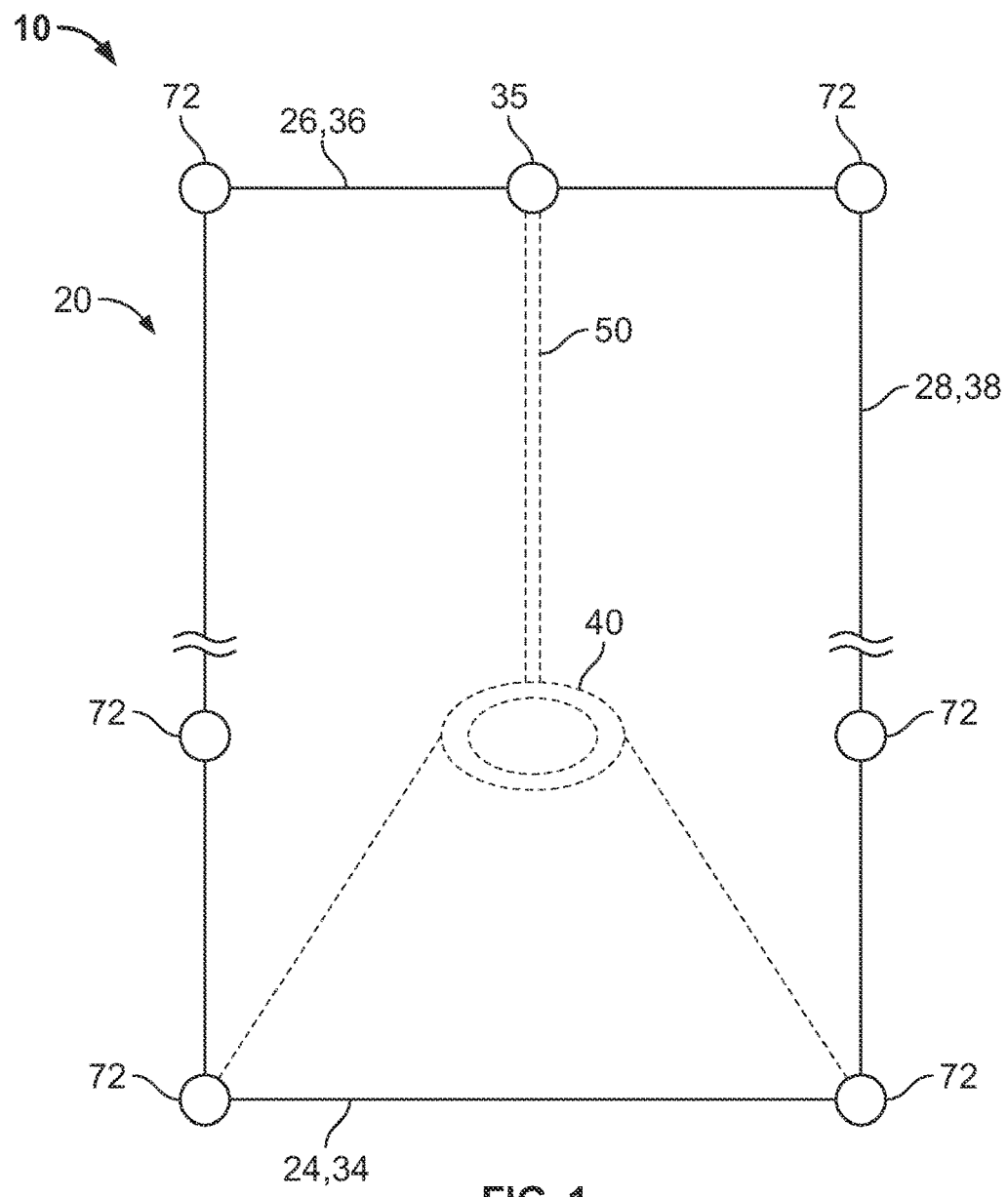
FIG. 1 is a top view of an erosion control apparatus per one or more embodiments described herein.

The following discussion presents various aspects of the present disclosure by providing examples thereof. Such examples are non-limiting, and thus the scope of various aspects of the present disclosure should not necessarily be limited by any particular characteristics of the provided examples. In the following discussion, the phrases "for example," "e.g.," and "exemplary" are non-limiting and are generally synonymous with "by way of example and not limitation," "for example and not limitation," and the like.

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z."

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a structure may be turned sideways so that its "top" surface is facing horizontally and its "side" surface is facing vertically, without departing from the teachings of the present disclosure.

In the drawings, various dimensions (e.g., layer thickness, width, etc.) may be exaggerated for illustrative clarity. Additionally, like reference numbers are utilized to refer to like elements through the discussions of various examples.

The following description refers to various example illustrations, which are provided to enhance the understanding of the various aspects of the present disclosure. It should be understood that the scope of this disclosure is not limited by the specific characteristics of the examples provided and discussed herein.

The present disclosure is generally directed to various embodiments of an erosion control apparatus. In some embodiments, the erosion control apparatus may include a flexible container having a mouth or opening to its interior. The container may be secured to a surface such as the bed or floor of a body of water. The container may be positioned such that environmental forces (e.g. wind or water currents) direct sediment into the interior of the container via its mouth. The container may include a cord attached to the mouth of the container and configured to close the mouth of the container as the container is filled with sediment. In particular, the cord may include a noose at one end and may be anchored at the opposite end. A loop of the noose may circumscribe the mouth of the container and tighten around the mouth as sediment urges the mouth away from the anchored end of the cord.

Figure 12:
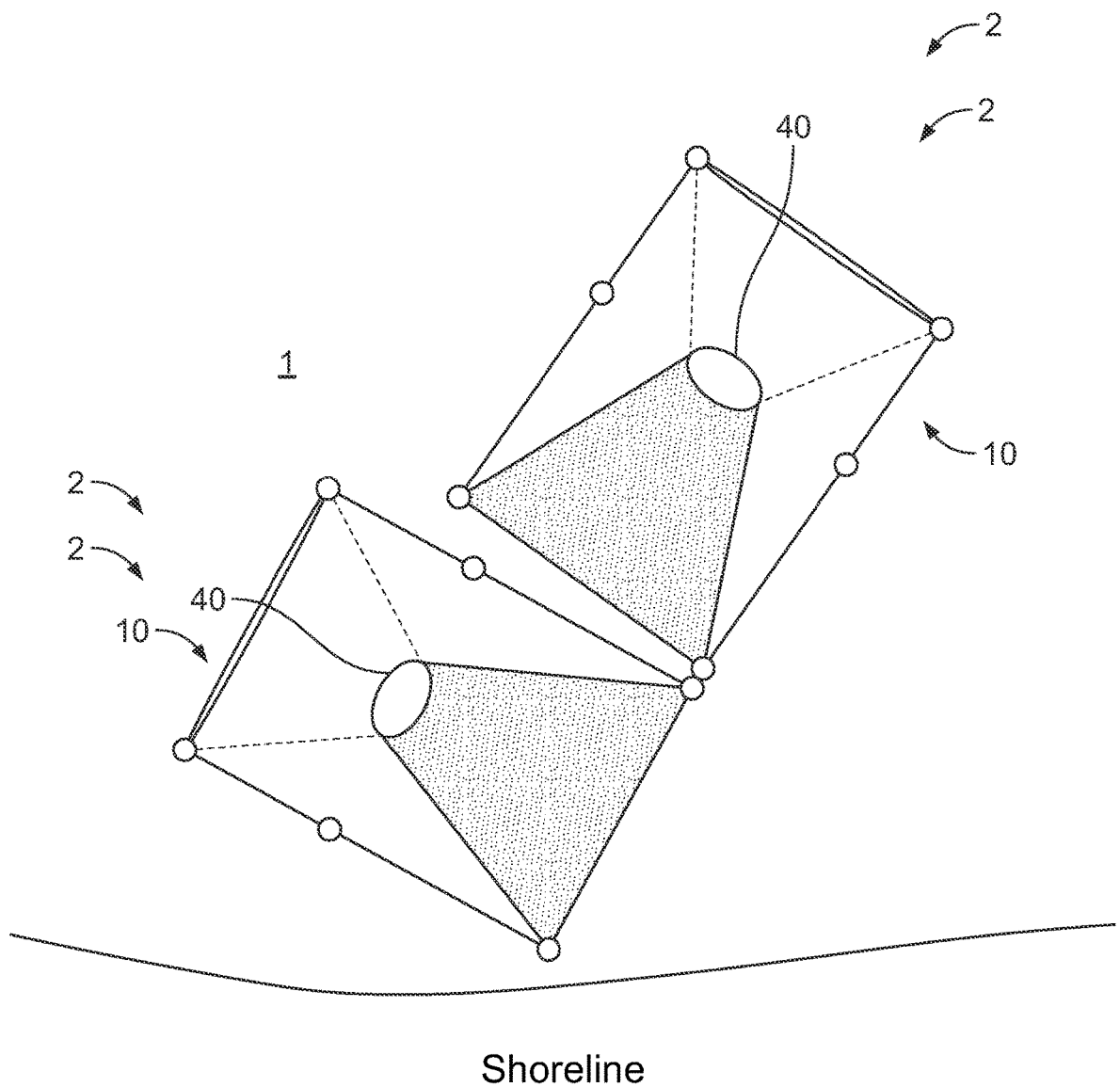
FIG. 12 shows a shoreline with two erosion control apparatus anchored to a bed of a body of water.

Referring now to FIG. 12, two erosion control apparatus 10 are depicted. As shown, the erosion control apparatus 10 may be anchored to a floor, bed, or surface 1 of a body of water. The erosion control apparatus 10 may be anchored such that container mouths 40 are otherwise directed toward environmental forces (e.g., wind and/or water currents) that carry sediment. In this manner, the erosion control apparatus 10 may receive sediment via container mouths 40 and thus may fill with sediment over a period of time without human intervention. As further shown, topology or other factors may result in environmental forces 2 being directed toward the erosion control apparatus 10 from multiple directions. As such, erosion control apparatus 10 may be oriented in a staggered configuration so as to direct container mouths 40 of different erosion control apparatus 10 toward different environmental forces.

Figure 2:
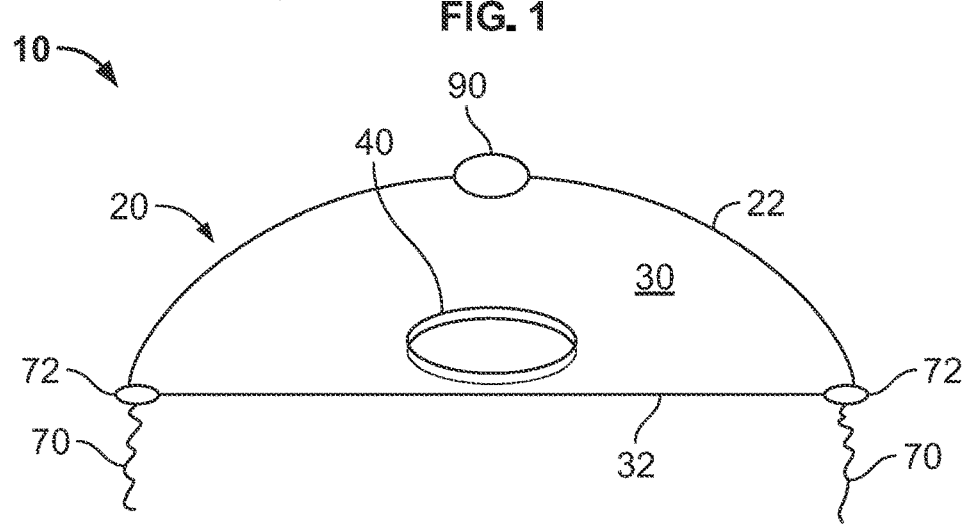
FIG. 2 is a front view of the erosion control apparatus shown in FIG. 1.
Figure 3:
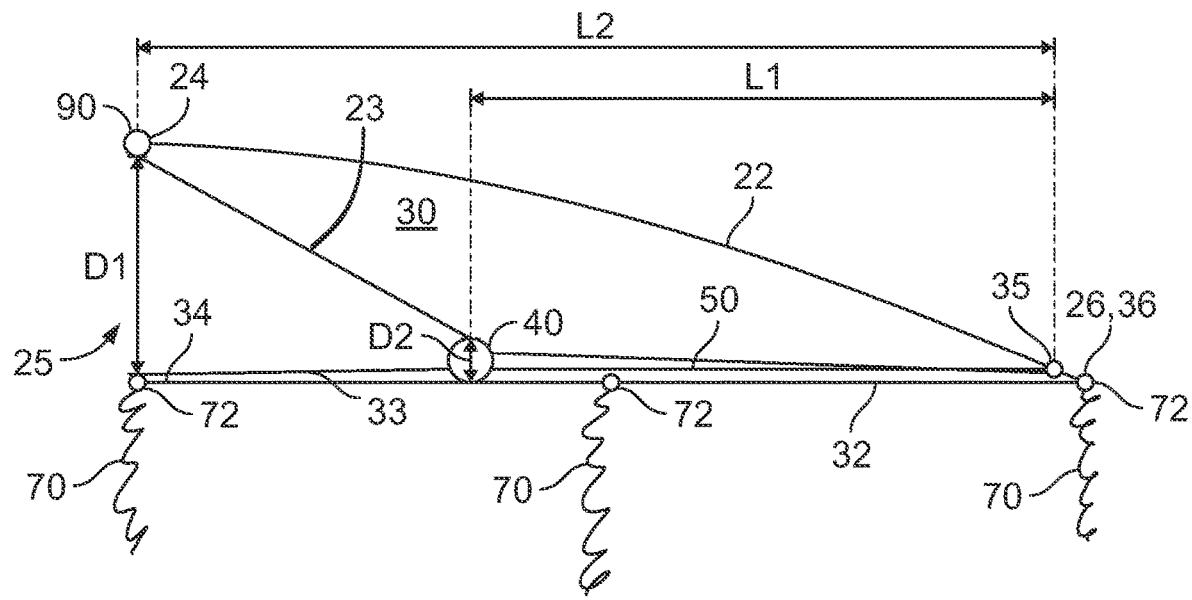
FIG. 3 is a cross sectional view of the erosion control apparatus shown in FIG. 1.

Further details of one embodiment of the erosion control apparatus 10 are shown in FIGS. 1-3. As shown, the erosion control apparatus 10 may include a container 20, a cord 50, anchors 70, and float 90. The container 20 may include a container upper side 22 and a container lower side 32 opposite the container upper side 22. The container upper side 22 may include a leading end 24, a trailing end 26 opposite the leading end 24, and lateral sides 28. The lateral sides 28 may join the leading end 24 to the trailing end 26. The container lower side 32 may include a leading end 34, a trailing end 36 opposite the leading end 34, and lateral sides 38. The lateral sides 38 may join the leading end 34 to the trailing end 36. The container 20 may also include a container mouth 40 between the leading ends 24, 34. The container mouth 40 provides an opening to a container interior 30.

As shown in FIG. 3, a float 90 may be coupled to the leading end 24 of the container upper side 22. The float 90 may bias the container upper side 22 away from the container lower side 32 when the container 20 is anchored to a bed of a body of water. Such biasing may separate the leading ends 24, 34 apart by a distance D1 that is greater than a diameter D2 of the container mouth 40. In this manner, a funnel upper portion 23 of the container upper side 22 and a funnel lower portion 33 of the container lower side 32 may be drawn toward the trailing ends 26, 36 and into the container 20. As such, funnel portions 23, 33 may form or define a funnel 25 from the leading ends 24, 34 to the container mouth 40. In particular, the funnel 25 may receive water and accompanying sediment via a wider opening at the leading ends 24, 34 and direct such water and sediment toward a smaller opening at the container mouth 40.

In some embodiments, the container 20 may be formed from a flexible material such as burlap. Further, the flexible material may be permeable to a fluid such as water that flows into the container interior 30 via the container mouth 40, but not permeable or at least less permeable to sediment carried by the fluid. Due to the container mouth 40 and the permeable material, sediment may be carried into the container interior 30 via environmental forces such as wind and water currents and trapped within the container interior 30. As such, the container interior 30 may fill with sediment over a period of time without further human intervention after installation.

The cord 50 may include a first end attached the container mouth 40 and a second end attached to an attachment point 35 toward the trailing ends 26, 36. As shown in FIG. 3, the cord 50 may draw the container mouth 40 toward the trailing ends 26, 36. In particular, a length L1 of the cord 50 between the container mouth 40 and the attachment point 35 may be shorter than a length L2 between the leading ends 24, 34 and the attachment point 35. Due to its shorter length, the cord 50 may draw the container mouth 40 into the container interior 30 and position the container mouth 40 between the leading ends 24, 34 and the trailing ends 26, 36.

The cord 50 may be configured to close the container mouth 40 as sediment accumulates in the container interior 30. In particular, the cord 50 may form a noose in which a loop 52 of the noose circumscribes the container mouth 40. See, e.g., FIG. 4A. As sediment fills the container interior 30, the sediment may urge the container mouth 40 away from the trailing ends 26, 36 and the attachment point 35. Such urging pulls the cord 50 and tightens the noose or reduces the circumference of the loop 52. The circumference of the loop 52 and the length of the cord 50 may be designed such that the cord 50 effectively closes the container mouth 40 when the container interior 30 is full of sediment.

Figure 4A:
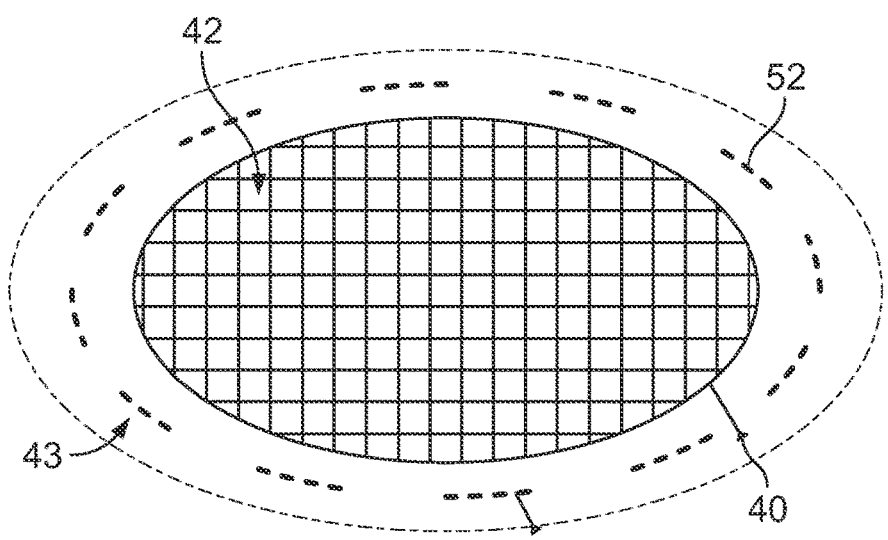
FIG. 4A is a front view depicting a channel of a container mouth of the erosion control apparatus shown in FIG. 1.
Figure 4B:
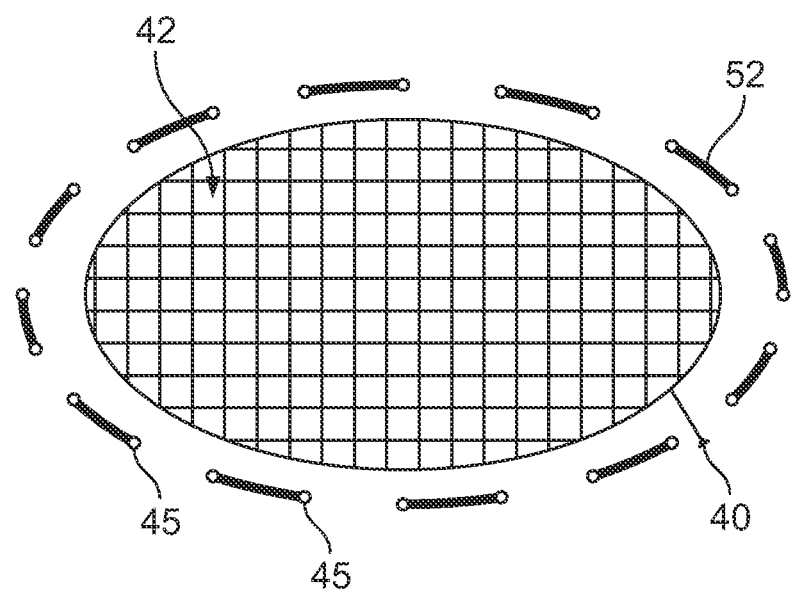
FIG. 4B is a front view depicting a series of holes of a container mouth of the erosion control apparatus shown in FIG. 1.

As shown in FIGS. 4A and 4B, the container mouth 40 may be covered by netting 42. The netting 42 may help prevent fish and other wildlife from entering the container mouth 40 and potentially being trapped within the container.

Figure 5:
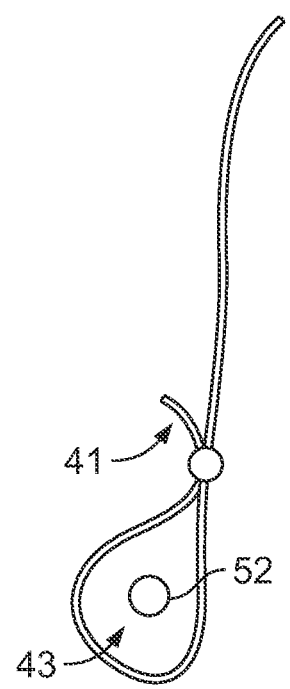
FIG. 5 is a cross sectional view of the container mouth shown in FIG. 4.
Figure 6:
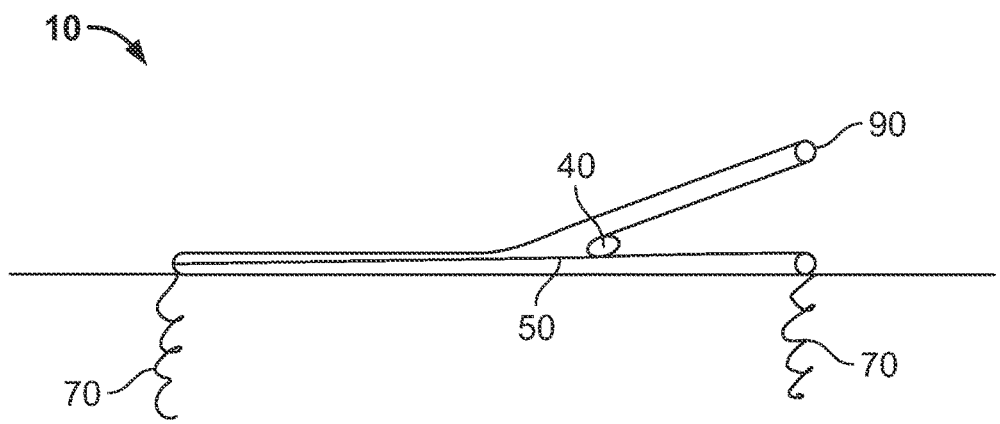
FIG. 6 is a cross sectional view of the erosion control apparatus of FIG. 1 when container interior is empty of sediment and the container mouth is in an open position.
Figure 7:
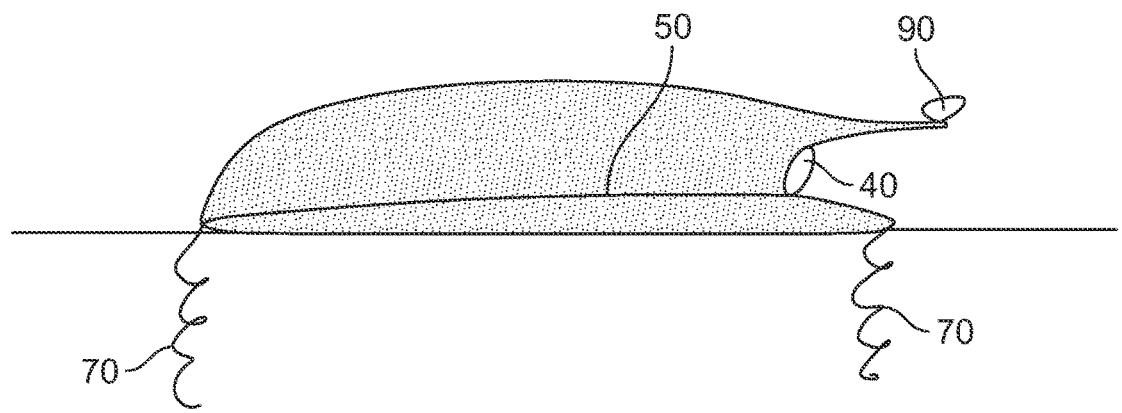
FIG. 7 is a cross sectional view of the erosion control apparatus of FIG. 1 when container interior is partial full of sediment and the container mouth is in a partially-closed position.
Figure 8:
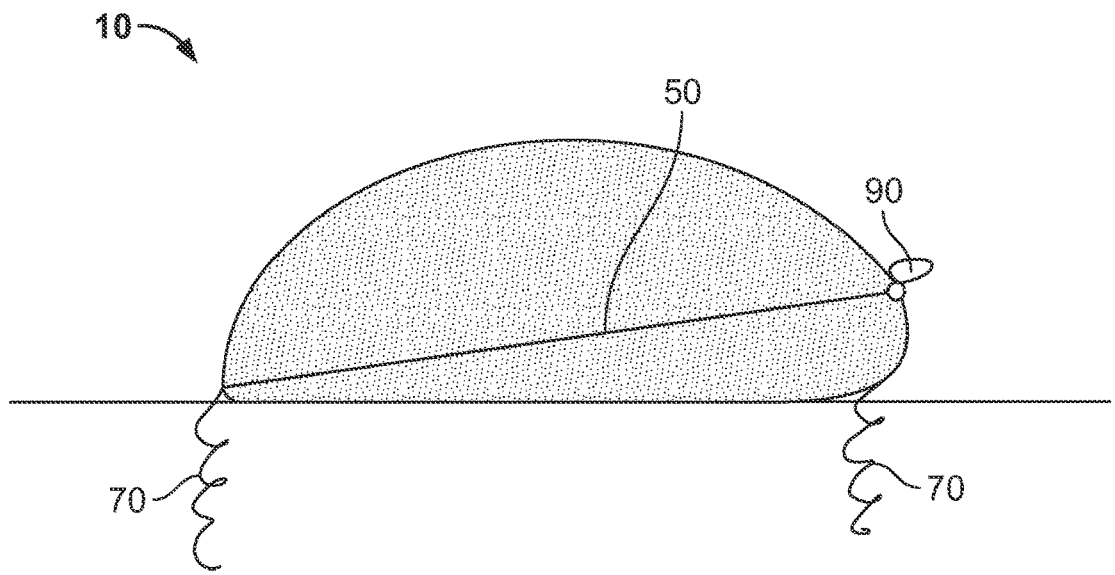
FIG. 8 is a cross sectional view of the erosion control apparatus of FIG. 1 when the container interior is full of sediment and the container mouth is in a closed position.

As shown in FIGS. 4A and 5, the leading end 41 of the container mouth 40 may be folded-over and stitched or otherwise affixed to a container surface to form a channel 43 that circumscribes the container mouth 40. The cord 50 and in particular the loop 52 may pass through the channel 43 and circumscribe the container mouth 40. The channel 43 may generally retain the loop 52 about the container mouth 40. Due to such retaining of the loop 52, as the circumference of the loop 52 is reduced due to tightening of the noose, the circumference of the container mouth 40 is likewise reduced.

In various embodiments, the cord 50 may be retained about the container mouth 40 via other mechanisms. For example, as shown in FIG. 4B, the channel 43 may be replaced with a sequence of holes 45 that circumscribe the container mouth 40. The loop 52 of the cord 50 may be threaded through the sequence of holes 45. In some embodiments, grommets may be placed in the holes 45 to reinforce the holes 45. Similar to the channel 43, the holes 45 generally retain the loop 52 about the container mouth 40. Due to such retaining of the loop 52, as the circumference of the loop 52 is reduced due to tightening of the noose, the circumference of the container mouth 40 is likewise reduced.

Referring now to FIGS. 1-3 and 6-8, the erosion control apparatus 10 may include several anchors 70 that anchor the container 20 to a bed of a body of water. To this end, the erosion control apparatus 10 may include a plurality of anchor points 72 about a periphery of the container 20. In some embodiments, the anchors 70 may be coupled to the anchor points 72 via one or more ties or lines (not shown) that pass through the anchor points 72. In other embodiments, the anchors 70 may pass through the anchor point 72 and into the bed of a body of water. In some embodiments, the anchor points 72 are merely holes that pass through the material forming the container 20. In such embodiments, the anchor points 72 may further include grommets that are placed in the holes to reinforce the anchor points 72. In other embodiments, the anchor points 72 may include tabs, hooks, or other protrusions that may be either fastened to the anchors 70 via ties, lines, straps, etc. or may directly engage the anchors 70 themselves.

Furthermore, the anchors 70 may take various forms. For example, the anchors 70 may comprise stakes that are to be driven into the bed via impact. In other embodiments, each anchor 70 may include a threaded end that permits screwing the anchor 70 into the bed of the body of water.

Figure 9:
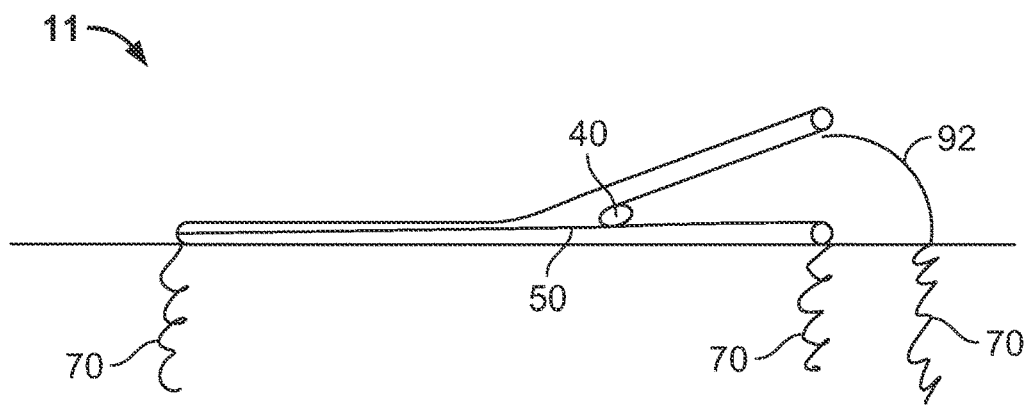
FIG. 9 is a cross sectional view of an erosion control apparatus with a leading edge biased with a spring and the container interior empty of sediment.
Figure 10:
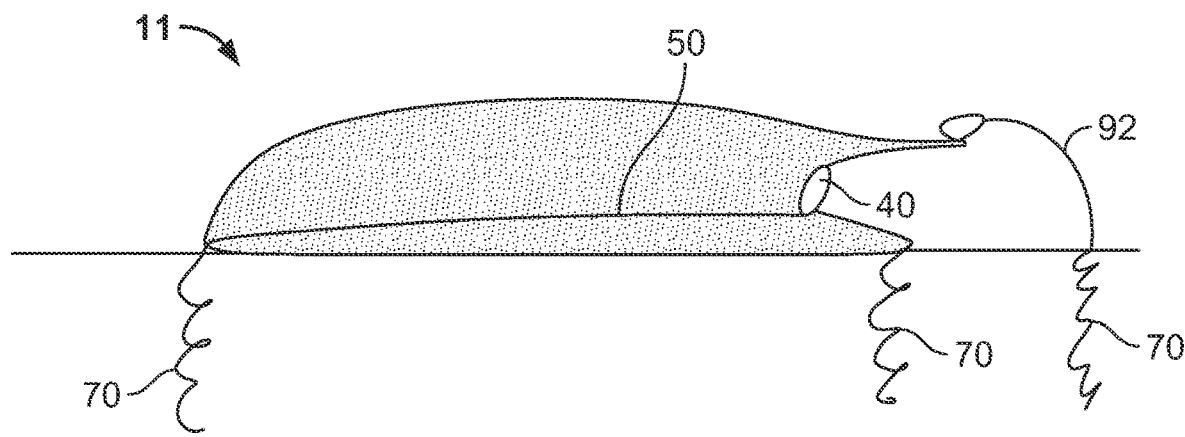
FIG. 10 is a cross sectional view of the erosion control apparatus of FIG. 9 when the container interior is partially full and the container mouth is in a partially-closed position.
Figure 11:
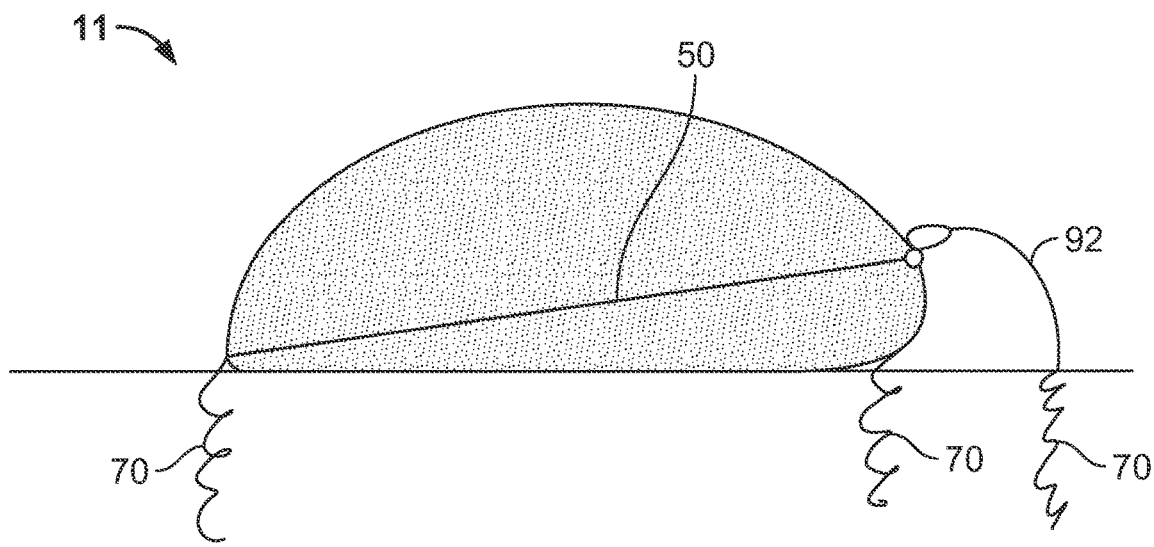
FIG. 11 is a cross sectional view of the erosion control apparatus of FIG. 9 when the container interior is full of sediment and the container mouth is in a closed position.

As explained above, the erosion control apparatus 10 may include a float 90 attached to the leading end 24 of the container upper side 22. FIGS. 9-11 depict an erosion control apparatus 11 that may be generally implemented in the same manner as the erosion control apparatus 10 shown in FIGS. 1-8. However, the float 90 of the erosion control apparatus 10 has been replaced with a wire spring 92. In particular, one end of the wire spring 92 may be coupled to the leading end 24 of the container upper side 22. The other end of the wire spring 92 may be coupled to the bed of the body of water via an anchor 70. In this manner, the wire spring 92, like the float 90, may bias the leading end 24 of the container upper side 22 away from the leading end 34 of the container lower side 32. Thus, as shown in FIGS. 9 and 10, the leading ends 24, 34 and adjoining funnel portions 23, 33 may funnel sediment toward the container mouth 40.

One advantage of the embodiment of FIGS. 9-11 is that the erosion control apparatus 11 does not rely upon water level to position the leading end 24. As such, the embodiment of FIGS. 9-11 may be more suitable for installations where the water is shallow. The embodiment of FIGS. 9-11 may also be suitable for land installations in which wind is relied upon to carry sediment into the container interior 30.

Figure 13A:
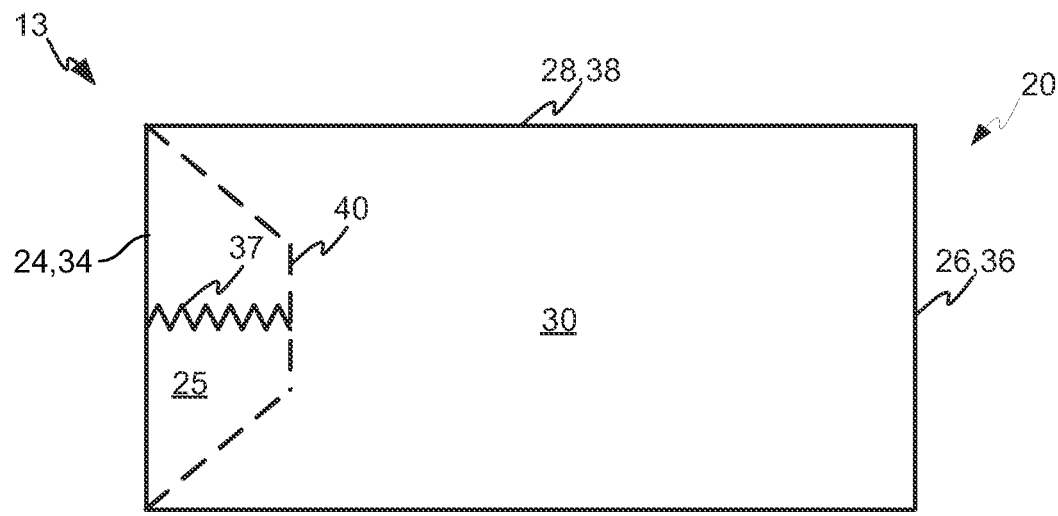
FIG. 13A depicts a top view of an erosion control apparatus comprising a container mouth affixed to a lower side of the container.
Figure 13B:
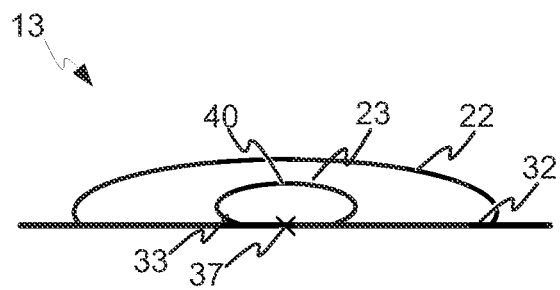
FIG. 13B depicts an end view of the erosion control apparatus of FIG. 13A with the container interior empty of sediment and the container mouth in an open position.
Figure 13C:
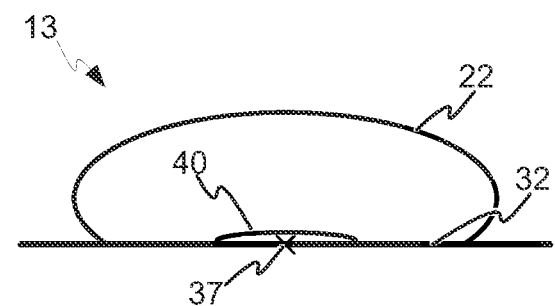
FIG. 13C depicts an end view of the erosion control apparatus of FIG. 13A with the container interior full of sediment and the container mouth in a closed position.

Referring now to FIGS. 13A-13C, another erosion control apparatus 13 is depicted. In particular, FIG. 13A provides a top view of the erosion control apparatus 13. FIG. 13B provides a view of the leading end of the container 20 in which sediment has yet to accumulate and place the container mouth 40 in a closed position. Further, FIG. 13C provides a view of the leading end of the container 20 in which accumulated sediment has placed the container mouth 40 in a closed position.

As shown, the erosion control apparatus 13 may be implemented similarly to the erosion control apparatus 10 of FIGS. 1-8. The erosion control apparatus 13, however, lacks the cord 50 of the erosion control apparatus 10. Instead, the erosion control apparatus 13 secure the funnel 25 to the container lower side 32. In particular, the funnel lower portion 33 may be affixed to the container lower side 32 via tacking, stitching, and/or fasteners 37. As depicted, one or more tacks, stitches, etc. may affix the funnel lower portion 33 to the container lower side 32 along a central line of funnel lower portion 33. As a result of such affixing, sediment may enter the container interior 30, settle on the funnel upper portion 23, and effectively close the container mouth 40 as the container 20 fills with sediment.

Figures 14A, 14B:
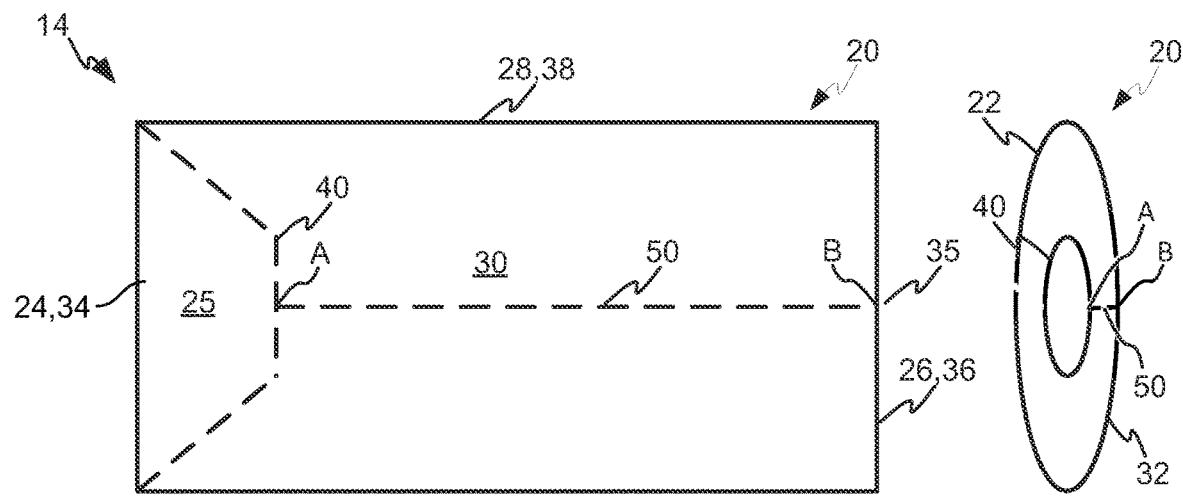
FIG. 14A depicts a top view of an erosion control apparatus comprising a cord that couples a container mouth to a trailing end of the container with the container interior empty of sediment and the container mouth in an open position.
FIG. 14B depicts an end view of the erosion control apparatus of FIG. 14A with the container interior empty of sediment and the container mouth in an open position.
Figures 14C, 14D:
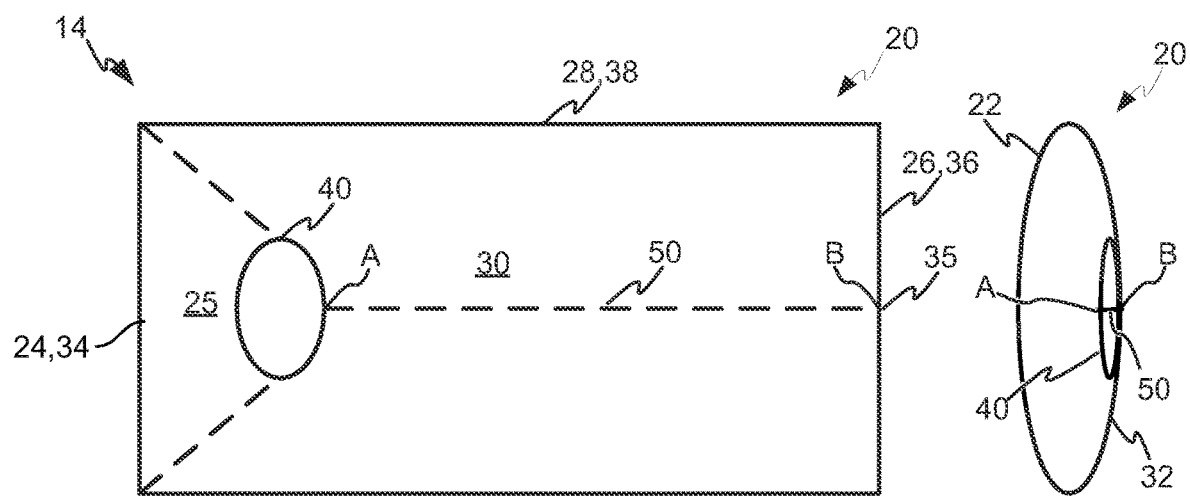
FIG. 14C depicts a top view of the erosion control apparatus of FIG. 14A with the container interior full of sediment and the container mouth in a closed position.
FIG. 14D depicts an end view of the erosion control apparatus of FIG. 14C with the container interior full of sediment and the container mouth in a closed position.

Referring now to FIGS. 14A-14D, another erosion control apparatus 14 is depicted. In particular, FIG. 14A provides a top view of the erosion control apparatus 14 in which sediment has yet to place the container mouth 40 in a closed position. FIG. 14B provides a view of the leading end of the container 20 in which sediment has yet to place the container mouth 40 in a closed position. Conversely, FIG. 14C provides a top view of the erosion control apparatus 14 in which sediment has accumulated and placed the container mouth 40 in a closed position. FIG. 14D provides a view of the leading end of the container 20 in which sediment has accumulated and placed the container mouth 40 in a closed position.

As shown, the erosion control apparatus 14 may be implemented similarly to the erosion control apparatus 10 of FIGS. 1-8. The erosion control apparatus 14, however, lacks the noose of the erosion control apparatus 10. Instead, the cord 50 of the erosion control apparatus 14 may be secured or fixed to the container mouth 40. In particular, one end of the cord 50 may be affixed stitched, tacked, passed through one or more holes and/or grommets, and/or otherwise secured to a bottom portion of the container mouth 40. The other end of the cord 50 may be attached to the trailing end 26, 36 of the container 20 at an attachment point 35 in a manner similar to the erosion control apparatus 10 of FIGS. 1-8. As a result of affixing the cord 50 to the container mouth 40, the cord 50 may draw the container mouth 40 toward the trailing end of the container 20 as the container 20 fills with sediment. Such drawing of the container mouth 40 toward the trailing end of the container 20 may orient or otherwise effectively close the container mouth 40 such that sediment is retained in the contain 20.

Figures 15A, 15B:
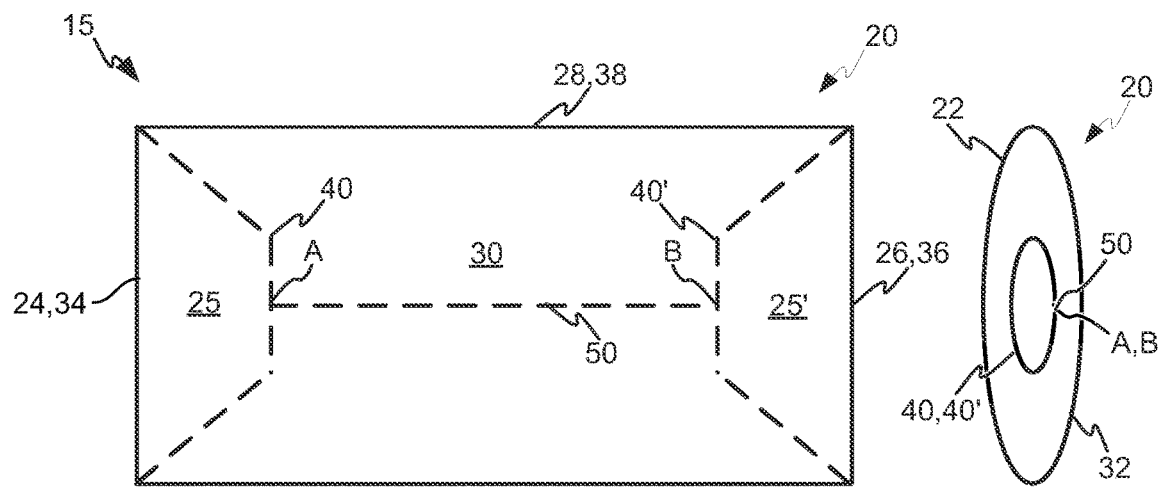
FIG. 15A depicts a top view of an erosion control apparatus comprising a cord that couples a first container mouth to a second container mouth with the container interior empty of sediment and the container mouths in an open position.
FIG. 15B depicts an end view of the erosion control apparatus of FIG. 15A with the container interior empty of sediment and the container mouths in an open position.
Figures 15C, 15D:
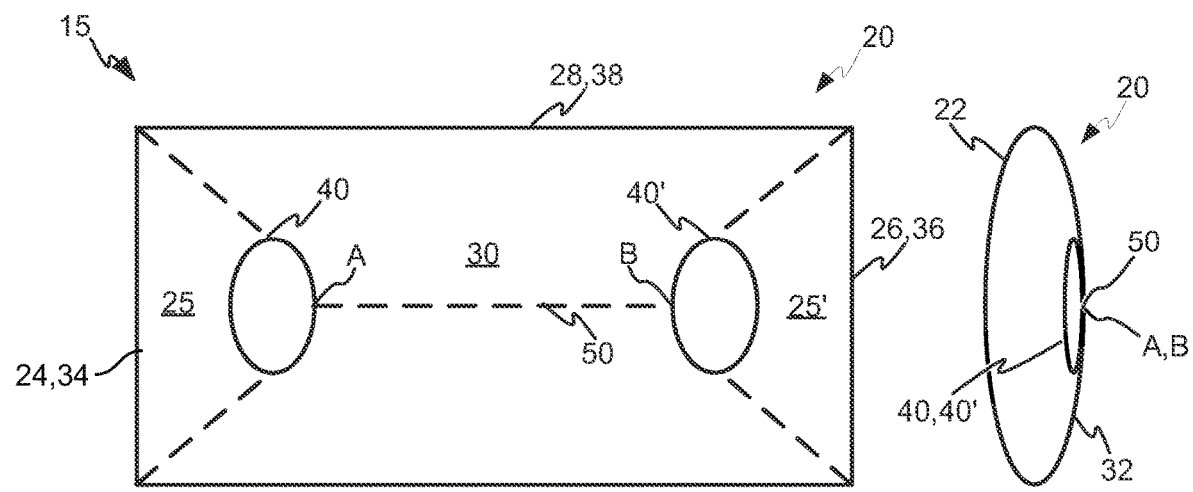
FIG. 15C depicts a top view of the erosion control apparatus of FIG. 15A with the container interior full of sediment and the container mouths in a closed position.
FIG. 15D depicts an end view of the erosion control apparatus of FIG. 15C with the container interior full of sediment and the container mouths in a closed position.

Referring now to FIGS. 15A-15D, another erosion control apparatus 15 is depicted. In particular, FIG. 15A provides a top view of the erosion control apparatus 15 in which sediment has yet to place the container mouths 40, 40' in a closed position. FIG. 15B provides a view of the leading end of the container 20 in which sediment has yet to place the container mouths 40, 40' in a closed position. Conversely, FIG. 15C provides a top view of the erosion control apparatus 15 in which sediment has accumulated and placed the container mouths 40, 40' in a closed position. FIG. 15D provides a view of the leading end of the container 20 in which sediment has accumulated and placed the container mouths 40, 40' in a closed position.

As shown, the erosion control apparatus 15 may be implemented similarly to the erosion control apparatus 10 of FIGS. 1-8. However, the erosion control apparatus 15 includes a first mouth 40 at the leading end 24, 34 of the container 20 and a second mouth 40' at the trailing end 26, 36 of the container 20. The second mouth 40' may be implemented similarly to the first mouth 40. Namely, trailing ends 26, 36 of the container 20 may be drawn into the container interior 30 to provide funnel portions of a funnel 25'. As such, sediment, water, etc. may be funneled to toward respective mouths 40, 40' from both the leading end and the trailing end of the container 20.

Moreover, as shown, a first end of the cord 50 may be coupled to the first mouth 40 and a second end of the cord 50 may be coupled to the second mouth 40'. In various embodiments, the first end of the cord 50 may include a first noose around the first mouth 40 and a second noose around the second moth 40' in a manner similar to the erosion control apparatus 10 of FIGS. 1-8. As such, the cord 50 may tighten the nooses around the mouths 40, 40' as the container 20 fills with sediment.

In various other embodiments, the first end of the cord 50 may be affixed to a bottom portion of the first mouth 40 and a bottom portion of the second mouth 40' in a manner similar to the erosion control apparatus 14 of FIGS. 14A-14D. As a result of affixing the cord 50 to the container mouths 40, 40', the cord 50 may draw the container mouths 40, 40' toward the container interior 30 as the container 20 fills with sediment. Such drawing of the container mouths 40, 40' may orient or otherwise effectively close the container mouths 40, 40' such that sediment is retained in the contain 20.

While erosion control apparatus 13, 14, 15 are depicted without a float 90, each erosion control apparatus 13, 14, 15 may include one or more floats 90 in a manner similar to the erosion control apparatus 10 of FIGS. 1-8. Similarly, erosion control apparatus 13, 14, 15 are depicted without a wire spring 92; however, each erosion control apparatus 13, 14, 15 may include one or more wire springs 92 in a manner similar to the erosion control apparatus 11 of FIGS. 9-11. Furthermore, erosion control apparatus 13, 14, 15 are depicted without anchors 70 or anchor points 72. However, each erosion control apparatus 13, 14, 15 may include one or more anchors and/or anchor points 72 similar to the erosion control apparatus 10, 11. Moreover, the erosion control apparatus 13, 14, 15 may include netting 42 over mouths 40, 40' similar to erosion control apparatus 10.

While particular embodiments of the invention have been shown, it will be understood that the invention is not limited thereto since modifications may be made by those skilled in the art, particularly in light of the foregoing teaching. It is, therefore, the appended claims which define the true spirit and scope of the invention.

What is claimed is:

1. An erosion control apparatus, comprising:
a flexible container comprising a container first end, a container second end opposite the container first end, a container first mouth toward the container first end, and a container first funnel that couples the container first mouth to the container first end; and
a cord having a cord first end directly coupled to the container first mouth and a cord second end directly coupled to the flexible container at an attachment point toward the container second end;
wherein the cord positions the container first mouth between the container first end and the container second end; and
wherein the container first funnel is configured to direct fluid and fluid-carried sediment through the container first mouth and into an interior of the flexible container so as to permit collection of fluid-carried sediment in the flexible container.

2. The erosion control apparatus of claim 1, wherein:
the attachment point is along the container second end;
a length of the cord is shorter than a length of the flexible container between the container first end and the container second end; and
wherein the cord positions the container first mouth between the container first end and the container second end due to the length of the cord being shorter than the length of the flexible container.

3. The erosion control apparatus of claim 2, wherein the cord restrains the container first mouth as fluid-carried sediment accumulates in the interior of the flexible container.

4. The erosion control apparatus of claim 1, comprising:
a container second mouth toward the container second end; and
a container second funnel that couples the container second mouth to the container second end; and
wherein the attachment point for the cord second end is the container second mouth; and
wherein the cord positions the container second mouth between the container first mouth and the container second end.

5. The erosion control apparatus of claim 4, wherein:
a length of the cord is shorter than a length of the flexible container between the container first end and the container second end; and
wherein the cord positions the container first mouth and the container second mouth between from the container first end and the container second end due to the length of the cord being shorter than the length of the flexible container.

6. The erosion control apparatus of claim 5, wherein the cord restrains the container first mouth and the container second mouth as fluid-carried sediment accumulates in the interior of the flexible container.

7. The erosion control apparatus of claim 1, comprising anchors that anchor the flexible container to a bed of a body of water.

8. The erosion control apparatus of claim 1, comprising:
anchor points about a periphery of the flexible container; and
anchors coupled to the anchor points.

9. The erosion control apparatus of claim 1, comprising a netting over the container first mouth.

10. The erosion control apparatus of claim 1, wherein:
the cord first end is directly coupled to a bottom portion of the container first mouth; and
the cord restrains the bottom portion of the container first mouth as fluid-carried sediment accumulates in the interior of the flexible container and at least partially closes the container first mouth.

11. The erosion control apparatus of claim 1, wherein:
the fluid is water; and
the flexible container is formed from a water permeable material that is permeable to water but not permeable to water-carried sediment.

12. The erosion control apparatus of claim 1, wherein:
the fluid is water; and
the flexible container is formed from a water permeable material that is less permeable to water-carried sediment.

13. An erosion control apparatus, comprising:
a flexible container comprising a container first end, a container second end opposite the container first end, a container first mouth toward the container first end, a container first funnel that couples the container first mouth to the container first end, a container second mouth toward the container second end, and a container second funnel that couples the container second mouth to the container second end; and
a cord having a cord first end directly coupled to the container first mouth and a cord second end directly coupled to the container second mouth;
wherein a length of the cord is shorter than a length of the flexible container between the container first end and the container second end;
wherein the cord positions the container first mouth and the container second mouth between the container first end and the container second end due to the length of the cord being shorter than the length of the flexible container;
wherein the container first funnel is configured to direct water and water-carried sediment through the container first mouth and into an interior of the flexible container; and
wherein the flexible container is formed from a water permeable material that permits water to flow from the interior of the flexible container through the water permeable material while retaining water-carried sediment in the interior of the flexible container so as to permit collection of water-carried sediment in the flexible container.

14. The erosion control apparatus of claim 13, wherein an edge of the water permeable material is folded-over and positioned within the interior of the flexible container such that the water permeable material defines the container first end, the container first mouth, and the container first funnel.

15. An erosion control apparatus, comprising:
a flexible container comprising:
a flexible container first end;
a flexible container second end opposite the flexible container first end, a flexible container top side that extends longitudinally from the flexible container first end to the flexible container second end;
a flexible container bottom side that extends longitudinally from the flexible container first end to the flexible container second end;
a flexible container first mouth toward the flexible container first end that provides an opening to an interior of the flexible container; and
a flexible container first funnel that narrows from the flexible container first end to the flexible container first mouth and is configured to direct fluid and fluid-carried sediment through the flexible container first mouth and into the interior of the flexible container; and
wherein multiple points of a lower funnel portion of the flexible container first funnel arranged longitudinally between the flexible container first end and the flexible container first mouth are secured to multiple points of the flexible container bottom side arranged longitudinally between the flexible container first end and the flexible container first mouth.

16. The erosion control apparatus of claim 15, comprising stitches that secure the multiple points of the lower funnel portion to the multiple points of the flexible container bottom side.

17. The erosion control apparatus of claim 15, comprising tacking that secures the multiple points of the lower funnel portion to the multiple points of the flexible container bottom side.

18. The erosion control apparatus of claim 15, wherein the multiple points of the lower funnel portion and the multiple points of the flexible container bottom side secure the lower funnel portion to the flexible container bottom side from the flexible container first end to the flexible container first mouth.

* * * * *